United States Patent
Oberle et al.

(10) Patent No.: US 8,033,192 B2
(45) Date of Patent: Oct. 11, 2011

(54) TRANSMISSION DRIVE UNIT WITH A RECEIVING MODULE FOR ADJUSTING A MOVABLE PART IN A MOTOR VEHICLE

(75) Inventors: Hans-Juergen Oberle, Rastatt (DE); Andreas Lienig, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 686 days.

(21) Appl. No.: 11/994,701

(22) PCT Filed: Aug. 14, 2006

(86) PCT No.: PCT/EP2006/065292
§ 371 (c)(1),
(2), (4) Date: Jan. 4, 2008

(87) PCT Pub. No.: WO2007/036389
PCT Pub. Date: Apr. 5, 2007

(65) Prior Publication Data
US 2008/0196524 A1 Aug. 21, 2008

(30) Foreign Application Priority Data
Sep. 28, 2005 (DE) .......................... 10 2005 046 356

(51) Int. Cl.
*F16H 25/20* (2006.01)
(52) U.S. Cl. ................... 74/89.23; 74/424.71; 74/606 R
(58) Field of Classification Search ................ 74/89.23, 74/424.71, 606 R
See application file for complete search history.

(56) References Cited

U.S. PATENT DOCUMENTS

| | | | | |
|---|---|---|---|---|
| 2,328,897 A * | 9/1943 | Gill | ............................ | 192/142 R |
| 2,444,886 A * | 7/1948 | Vickers | ........................ | 74/89.39 |
| 2,479,019 A * | 8/1949 | Ochtman | ..................... | 74/89.42 |
| 2,981,518 A * | 4/1961 | Wise | .............................. | 254/101 |
| 3,798,983 A * | 3/1974 | Smith | ........................... | 74/89.35 |
| 7,066,041 B2* | 6/2006 | Nielsen | ........................ | 74/89.35 |
| 2002/0073790 A1 | 6/2002 | Wiesler et al. | | |

FOREIGN PATENT DOCUMENTS

| | | |
|---|---|---|
| DE | 41 01 470 | 6/1992 |
| EP | 0 759 374 | 2/1997 |
| EP | 1 223 073 | 7/2002 |
| JP | 5-50873 | 3/1993 |
| WO | 2004/028305 | 4/2004 |
| WO | 2006/024598 | 3/2006 |

* cited by examiner

*Primary Examiner* — William C Joyce
(74) *Attorney, Agent, or Firm* — Michael J. Striker

(57) ABSTRACT

A transmission drive unit for adjusting a movable part in a motor vehicle has a support tube, a drive wheel, which is drivable using a drive assembly rotatably supported on the support tube and located on a spindle installed first in the support tube as a separate component and received in the bearing receptacle; a customer-specific receiving module, which subsequently and separately is attached to the support tube and includes a receptacle for a fastening device on the motor vehicle or the part to be adjusted, and the material of the receiving module has a higher strength than the material of the support tube.

10 Claims, 3 Drawing Sheets

TRANSMISSION DRIVE UNIT WITH A RECEIVING MODULE FOR ADJUSTING A MOVABLE PART IN A MOTOR VEHICLE

CROSS-REFERENCE TO RELATED APPLICATION

The invention described and claimed hereinbelow is also described in German Patent Application DE 10 2005 046 356.8 filed on Sep. 28, 2006. This German Patent Application, whose subject matter is incorporated here by reference, provides the basis for a claim of priority of invention under 35 U.S.C. 119(a)-(d).

BACKGROUND OF THE INVENTION

The present invention relates to a transmission drive unit with a receiving module, in particular for adjusting a movable part in a motor vehicle.

Publication EP 0 759 374 A2 made known a device for adjusting a seat in a motor vehicle, which may absorb considerably greater forces than during normal operation. Forces such as these may be caused, e.g., by a traffic accident. It is important that the vehicle seat remain fixedly connected with the body, to ensure that the protective measures (seat belt, air bag) provided for the vehicle occupants may function. With the device described above, a counternut that accommodates a threaded spindle is fixedly connected with the body. The threaded spindle is driven via a worm gear pair by an electric motor, which is fixedly connected with the seat. The transmission housing of the worm gear pair is made of plastic and is connected with the drive motor via a further housing part. When the drive motor is actuated, the threaded spindle rotates and displaces the transmission housing, including the drive motor and seat, relative to the counternut. To prevent the transmission housing from tearing loose from the threaded spindle, e.g., when an accident occurs, an additional, metallic, U-shaped support part is provided, which connects the transmission housing via a hinged fastening bolt, as the fastening device, with the drive motor and, therefore, the seat. If the plastic transmission housing is unable to withstand the strong flow of force, it is held by the metallic support part using an additional counternut. The disadvantage of this design is that, when a change is made to the customer interface for attaching the transmission drive unit, the entire transmission housing—including the complex support design—must be redesigned in order to provide the desired mechanical interface for every customer. In addition, the formation of the screw-on eye for the pivot bolt takes up installation space in the axial direction toward the spindle, which is very limited in many applications.

SUMMARY OF THE INVENTION

The inventive transmission drive unit and its inventive manufacturing method have the advantage that, by locating the drive wheel of the spindle in a support tube, a separate standardized assembly is created that is independent of a transmission housing or the drive assembly. By eliminating a conventional transmission housing, with which the driven element of the drive assembly and the drive wheel of the spindle are both located in a closed housing, the transmission drive unit, as a modular system, may be adapted—very flexibly—to different attachment devices of customer-specific applications. The same preassembled assembly may therefore always be used with the standard support tube, and the mechanical interface for attaching the transmission drive unit to the body or a part to be adjusted may be easily varied afterward using a customer-specific receiving module for the attachment device. By using a standardized support tube, on which different receiving modules may be attached depending on the customer's wishes, a very high level of flexibility of the spindle drive is attained, in a very cost-effective manner. Advantageously, the receiving module may be subsequently attached to the support tube, fully independently of the installation of the spindle and its drive wheel in the support tube. The overall axial length of the transmission drive unit may be reduced by shortening the support tube, since there is no need to form a receptacle—e.g., a radial bore for a fastening bolt—in the standard support tube.

When the receiving module includes, e.g., a circular recess, the receiving module may be attached very easily on the outer circumference of a round support tube. With this design of the receiving module as an outer ring, it may also be installed before the spindle is installed on the support tube.

In an alternative embodiment, the receiving module is attached inside the support tube, to the inner wall surface. The receiving module may be designed as an inner ring or a complete disk, and it simultaneously serves to reinforce the support tube. These diverse receiving modules may be connected very easily with the standard support tube in accordance with the particular interface requirements.

The annular design of the receiving module is also suited, in particular, for a plunger spindle, in the case of which the spindle extends out of the support tube at both axial ends.

The receiving module with a thread may be screwed into or onto the support tube particularly easily. To this end, the support tube includes—on its outer circumferential surface and/or its inner wall, at least on an axial end region—a thread, which engages in a corresponding thread of the receiving module. As an alternative, the support element includes a self-tapping or self-cutting thread that forms a counter-thread in the support tube when installed in/on the support tube.

In an alternative embodiment, the receiving module may also be bonded or welded to the support tube, or it may be caulked with the support tube via cold deformation. With these connection methods, the support tube and the receiving module may also have a non-circular cross section.

Due to the modular design of the transmission drive unit, the standard support tube may be made of an easily formed deep-drawn metal, and the receiving module may be made of a stronger material, e.g., hardened steel, in order to provide strong crash resistance. The material used to form the receptacle may be optimized in terms of strength, bearing properties, and noise formation.

A fastening bolt is a popular customer interface for connecting the spindle drive to the motor vehicle; it may be rotatably supported in a hole-shaped receptacle in the transmission drive unit. The crash forces that act via the fastening device are transferred to the support tube via the fastening bolt in the receptacle. By designing the fastening device as a pivot bolt, the spindle is hingedly supported between the part to be adjusted and the body, thereby resulting in a greater degree of freedom of the adjusting motion.

In a further embodiment, the receptacle of the receiving module is designed as a cylindrical bolt that extends radially to the spindle. A hinged fastening bolt is therefore already practically integrally formed with the drive unit, which may be rotatably connected very easily with the body or the part to be adjusted.

It is particularly favorable when the receiving module is inserted axially in the support tube until it bears axially against the end plate of the spindle. As a result, the axial play of the spindle may be eliminated via the installation of the receiving module. At the same time, axial compression forces that act on the spindle are transferred via the end plate to the receiving module and, therefore, to the fastening device of the body, via which the spindle remains positioned with its drive wheel in the support tube.

In an advantageous embodiment, the receiving module is designed as an end plate with a pot-shaped bearing receptacle in which the spindle may be supported radially and axially. The number of components may therefore be reduced, while also further shortening the overall axial length of the support tube and, therefore, the transmission drive unit. To this end, the receiving module is made of plastic, in particular, thereby enabling the spindle and/or the drive wheel to be supported directly in the receiving module—which is designed as an end plate—with a minimum of friction. This receiving module may interact axially, e.g., directly with a spherical, metallic axial stop of the spindle. By making the receptacle out of plastic, the friction with the fastening device may be reduced, and the noise formation may be reduced.

Ideally, the receiving module is designed and integrally formed with the support tube in such a manner that the mechanical strength of the support tube is reinforced as a result. Regions in the support tube in which recesses—in particular for receiving fastening devices or for adjusting the axial play of the spindle—are integrally formed may therefore also be supported, for example.

In a preferred embodiment, the spindle, which is supported in the support tube and includes the receptacle for the fastening device, is a first preassembled assembly, which may be coupled very easily via a coupling device with a standardized drive assembly, e.g., an electric motor with an armature worm. To transfer force to the drive wheel of the spindle, the driven element of the drive assembly extends through an opening in the support tube. Since the recess in the support tube is relatively small, the support tube may absorb high forces without the spindle being torn out of the support tube. This inventive transmission drive unit therefore does not include a classical transmission housing that encloses the driven element of the drive assembly and the drive wheel of the transmission, but rather includes a largely closed support tube, with the driven element being fixed in place relative thereto using the coupling device. To attach the coupling device, further recesses are formed in the support tube, for example, into which a fastening means of the coupling device engages for fixation. The drive assembly with its driven element is located completely outside of the flow of forces that occurs during a crash.

The inventive manufacturing method according to independent claim 13 has the advantage that the assembly with the support tube is installed independently of the receiving module. As a result, at the end of the processing of installing the assembly with the support tube, the support tube may be easily varied in terms of the customer interface using different receiving modules. A modular system of this type, with which different drive assemblies may also be used, is very cost-favorable and customer-friendly.

When the receiving module may be rotated relative to the support tube during installation, the receptacle may be attached to the support tube in a customer-specific angular position. The location of the fastening device is therefore independent of the radial orientation of the drive assembly.

The receiving modules may be very easily varied in terms of shape, connection means, and material without having to change the design and assembly process of the entire transmission drive unit.

Various exemplary embodiments of an inventive transmission drive unit are presented in the drawing, and they are described in greater detail in the description below.

DESCRIPTION OF THE PREFERRED EMBODIMENTS

Figure 1:
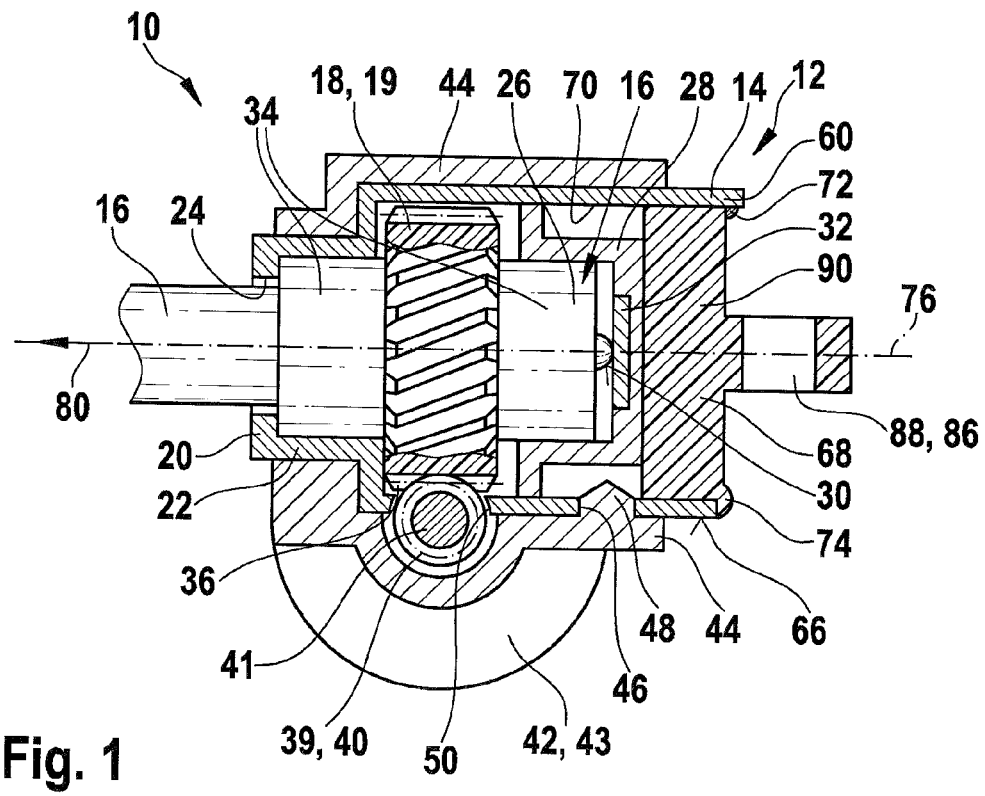
FIG. 1 shows a cross section through an inventive transmission drive unit.

Transmission drive unit 10 shown in FIG. 1 is composed of a first assembly 12, with which a spindle 16 with a drive wheel 18 located thereon is supported in a support tube 14. Support tube 14 is manufactured, e.g., using deep drawing, and includes a pot-shaped bearing receptacle 22 for drive wheel 18 on an end region 20. Spindle 16 extends out of support tube 14 through opening 24 in pot-shaped bearing receptacle 22 and is connected with the body, e.g., via a counternut, which is not shown. With this exemplary embodiment, the other spindle end 26 is located inside support tube 14 and is supported axially and radially via an end shield 28 that is attached inside support tube 14. Spindle end 26 includes, e.g., a spherical stop surface 30, which rests axially against pot-shaped end shield 28. Optionally, a stiffer thrust washer 32 may be located in end shield 28. In this exemplary embodiment, drive wheel 18 is designed as worm wheel 19, which includes axial projections 34 for radial support. Drive wheel 18 is injection-molded, e.g., using plastic, directly onto spindle 16 and includes toothing 36 that meshes with a driven element 40 of a drive assembly 42. Drive assembly 42 is designed as an electric motor 43 and is connected with first assembly 12 using a coupling device 44. Support tube 14 has a projection 46, which is used to position support tube 14 relative to coupling device 44, and into which a fixing element 48 of coupling device 44 engages. To transfer the torque from drive assembly 42 to separate assembly 12, support tube 14 has a radial recess 50 into which driven element 40 engages. Driven element 40 is designed, e.g., as worm 39, which is located on an armature shaft 41 of electric motor 43.

Support tube 14, as the standard component, practically forms a housing for separate assembly 12, on which various receiving modules 90 may be located. Receiving module 90 shown in FIG. 1 includes a receptacle 88, which is designed as a screw-on eye 86, into which a fastening device 54, e.g., a pivot bolt 55, may be slid. Receptacle 88 is located on axis 76 in the center of support tube 14. With fastening device 54, support tube 14 is connected—e.g., in a hinged manner—with a part 58 to be adjusted in the motor vehicle, e.g., a not-shown seat or a seat part that is adjusted relative to another seat part. Receiving module 90 is designed as circular disk 68, which bears against inner wall 70 of support tube 14. In the top half of the drawing, receiving module 90 is connected with support tube 14, e.g., via welds 72. The lower half of the drawing shows an alternative attachment of receiving module 90 using caulking 74 via plastic material deformation.

If a compression force 80 acts on spindle 16 when an accident occurs in axial direction 76, spindle 16 is supported via drive wheel 18 in pot-shaped bearing receptacle 22 of support tube 14. Tension force 80 is transferred via support tube 14 to receiving module 90 with receptacle 88. In this exemplary embodiment, receiving module 90 is made of a hardened steel, so that it may absorb very high forces 80 and dissipate them via fastening device 54 to the body or part 58 to be adjusted.

As a result, spindle end 26 and, therefore, part 58 to be adjusted, remain in their intended places when a crash occurs.

Figure 2:
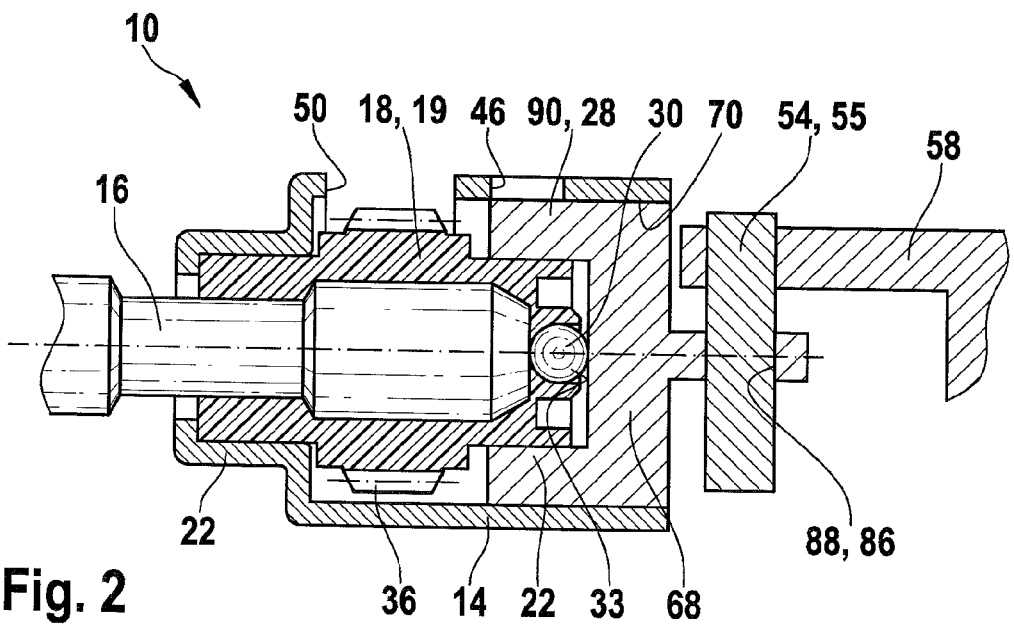
FIG. 2 shows a side view of a further assembly with the support tube, which may be installed separately.

A further exemplary embodiment of an inventive spindle drive 10 is shown in FIG. 2, with which receiving module 90 is designed simultaneously as end plate 28 for the radial and axial support of spindle 16 in support tube 14. To this end, receiving module 90 includes a pot-shaped bearing receptacle 22, in which an extension 34 of drive wheel 18 bears radially. The axial stop of spindle 16 is formed by a metal ball 30, which, in this case, bears axially directly against a base surface 33 of pot-shaped bearing receptacle 22 of receiving module 90. Receiving module 90 is made of plastic, thereby minimizing the friction that occurs between spindle 16 and receiving module 90. A receptacle 88 is integrally formed as one piece with receiving module 90, receptacle 88 being designed as eye 86. Pivot bolt 55, as fastening device 54, is slid into receptacle 88, and hingedly connects spindle drive 10 with a part 58—which is shown schematically—to be adjusted. Receiving module 90 bears via its entire axial extension against inner wall 70 of support tube 14, and is fixed in position therein, e.g., via bonding. By eliminating a separate end plate 28, the overall axial length of support tube 14 is reduced compared with the design in FIG. 1.

Figure 3:
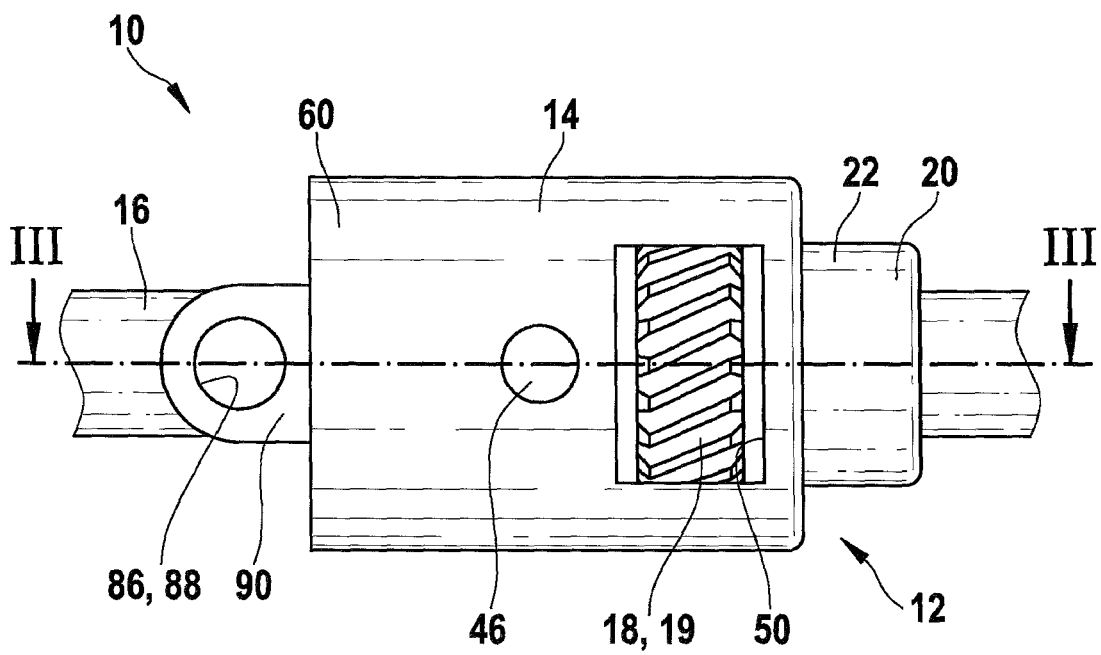
FIGS. 3 and 4 show a view and cross section of a further exemplary embodiment.
Figure 4:
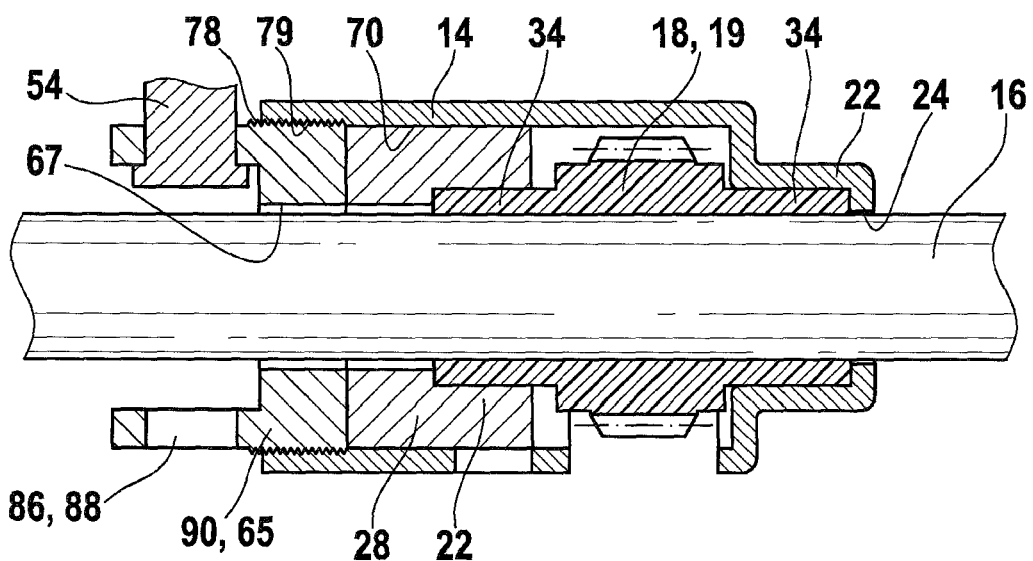

A further variation of the present invention is shown in FIG. 3 and FIG. 4, with which a plunger spindle 16 is supported in support tube 14. Spindle 16 extends out of support tube 14 at both ends 20, 60. Spindle 16 is supported via drive wheel 18 and its axial extensions 34 on one side directly in pot-shaped bearing receptacle 22 of support tube 14. Spindle 16 passes through opening 24 in support tube 14. On the opposite side, drive wheel 18 is supported in pot-shaped bearing receptacle 22 of a separate end plate 28, which bears against inner side 70 of support tube 14. In this embodiment, receiving module 90 is designed as an inner ring 65, through central opening 67 of which spindle 16 passes. Receiving module 90 includes—as receptacle 88—two eyes 86, which are located on both sides of spindle 16. A fastening device 54 engages in receptacles 88. Fastening device 54 is designed, e.g., as a rivet connection, and it connects transmission drive unit 10 with part 58 to be adjusted, or with the body. Receiving module 90 includes a thread 78 that engages in a counter-thread 79 of support tube 14, thereby attaching receiving module 90 to support tube 14 in a form-fit manner.

Figure 5:
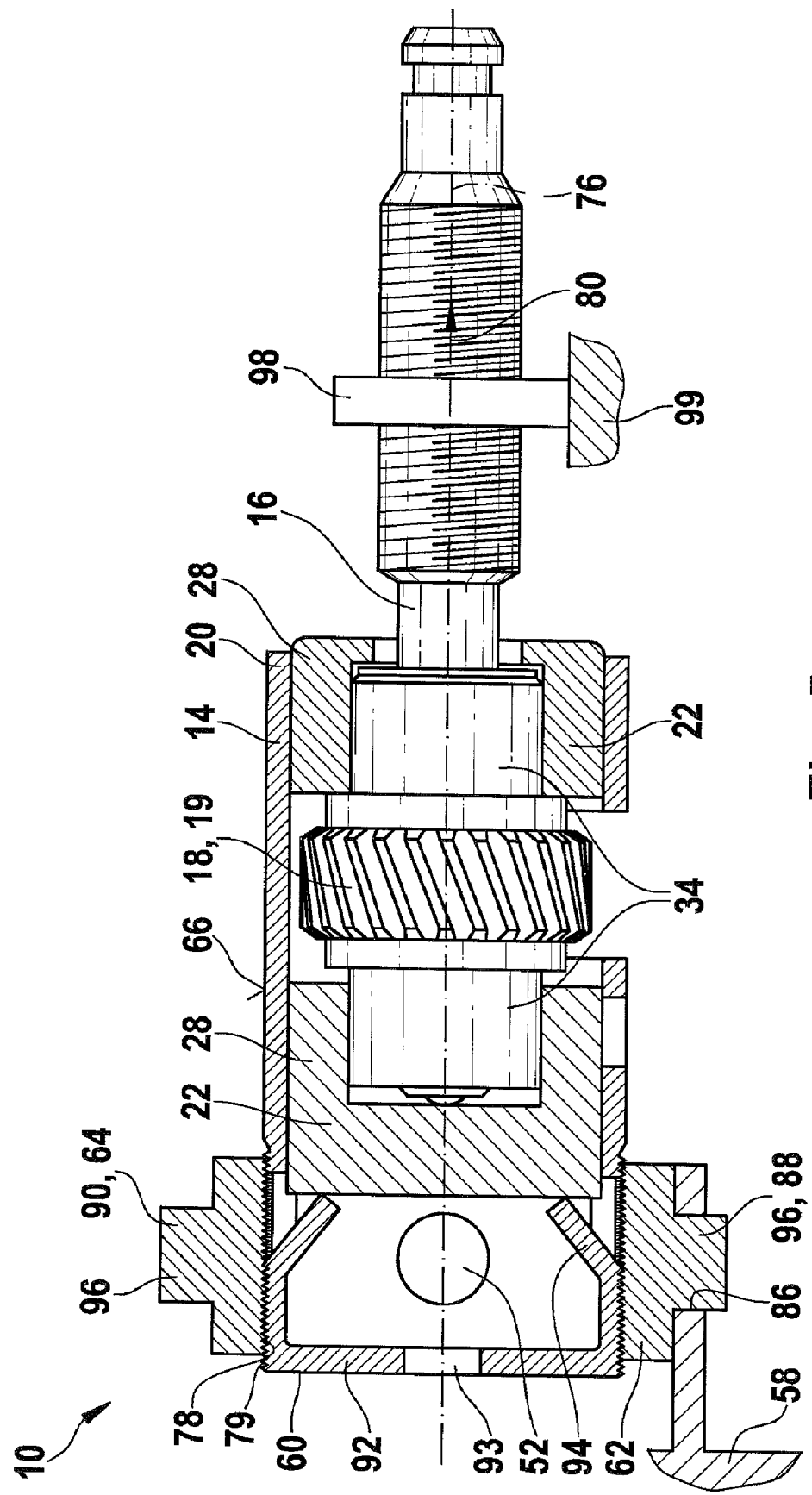
FIG. 5 shows a cross section of a further inventive assembly.

FIG. 5 shows a further exemplary embodiment of an inventive transmission drive unit 10, with which support tube 14 includes a largely closed base surface 92 at one end 60. An installation opening 93, for instance, is formed in base surface 92, to simplify the secure support of spindle 16 in end plate 28. In addition, caulking tabs 94 are pressed into support tube 14. End plate 28 with pot-shaped bearing receptacle 22 bears axially against caulking tabs 94. With this embodiment, a second separate end shield 28 with a pot-shaped bearing receptacle 22 is located in support tube 14 on end 20 at which spindle 16 extends out of support tube 14. A receptacle 52 designed as a radial bore is integrally formed directly in support tube 14 for an attachment device 54. Receptacle 52 is a standard interface for the customer, although it may be modified using a receiving module 90 to be a customer-specific, individual receptacle 88. To this end, receiving module 90 is designed as outer ring 64, which is located on outer circumferential surface 66 of support tube 14. Receiving module 90 includes an inner thread 78, which engages in counter-thread 79—designed as an outer thread—of support tube 14. Receiving module 90 covers the radial cut-outs formed in support tube 14 via receptacle 52 and caulking tabs 94. With this embodiment, receiving module 90 also serves as support element 62, which increases the strength of support tube 14 at its end region 60. Receiving module 90 includes a cylindrical bolt 96 as receptacle 88, which extends radially outwardly. Cylindrical bolt 96 corresponds to an integration of pivot bolt 55—designed as fastening device 54—in FIG. 2. On receptacle 88, therefore, part 58 to be adjusted may therefore be connected with spindle drive 10, e.g., directly, via eyes 86 integrally formed on receptacle 88. If crash forces occur during an accident, which act on part 58 to be adjusted due to its inertia, these forces are transferred via receptacle 88 of receiving module 90 to support tube 14. Spindle 16 is held fixedly against body 99, e.g., via a counternut 98, so that counterforce 80 acts in spindle 16, in order to hold part 58 to be adjusted in its intended position. With conventional spindle drives, the transmission housing poses the greatest risk, since, if it breaks, part 58 to be adjusted comes loose from spindle 16. With inventive transmission drive unit 10, the crash forces are safely absorbed by support tube 14, however, without the forces acting on drive assembly 42 or its driven element 40. Via inventive receiving module 90, the crash forces are safely transferred from part 58 to be adjusted to support tube 14 and via spindle 16 to body 99.

It should be noted that, with regard for the exemplary embodiments presented in the figures and the description, many different combinations of the individual features are possible. For example, support tube 14 may be manufactured using different methods, and it may have different specific designs. Instead of being designed as an integrally formed, pot-shaped bearing receptacle 22, support tube 14 may also be designed as a smooth cylindrical tube in which two separate end shields 28 for supporting spindle 16 are located. Spindle 16 is preferably supported via drive wheel 18 supported thereon, although, in one variation, it may also be supported via bearing surfaces that are integrally formed directly on spindle 16. The device used to transfer torque from drive assembly 42 is not limited to a worm gear pair 19, 39. Torque may also be transferred, e.g., using a spur gear. The specific shape and material used for receiving module 90 are selected depending on the strength requirement. The receiving module may simultaneously provide support for the support tube. The cross section of support tube 14 is not limited to a circle. When support tube 14 is cylindrical in design, receiving module 90 may simply be screwed on or into place.

What is claimed is:

1. A transmission drive unit (10) for adjusting a movable part (58) in a motor vehicle comprising a support tube (14) having a bearing receptacle (22), a drive wheel (18), which is drivable using a drive assembly (42), which is rotatably supported on the support tube (14) and which is located on-a spindle (16) installed first in the support tube (14) as a separate component and received in the bearing receptacle (22); and a customer-specific receiving module (90), which subsequently and separately is attached to the support tube (14), and which includes a receptacle (88) for a fastening device (44) on the motor vehicle (99) or the part (58) to be adjusted, wherein the material of the receiving module (62) has a higher strength than the material of which the support tube (14) is made, which is manufactured as a metallic deep-drawn part.

2. The transmission drive unit (10) as recited in claim 1, wherein the receiving module (90) bears against an outer circumferential surface (66) and/or an inner wall surface (70) of the support tube (14).

3. The transmission drive unit as recited in claim 2, wherein the receiving module (90) bears against an axial end (60) of the support tube (14).

4. The transmission drive unit (10) as recited in claim 1, wherein the receiving module (90) is connectable with the support tube (14) using a thread (78), which is self-cutting.

5. The transmission drive unit (10) as recited in claim 1, wherein the receiving module (90) is designed as a support element (62) that increases the mechanical stiffness of the support tube (14) for diverting crash forces.

6. The transmission drive unit (10) as recited in claim 1, wherein the drive assembly (42) is connected via a coupling device (44) with the support tube (44), which includes a radial recess (50) that enables a driven element (40) to engage in the drive wheel (18).

7. A method for manufacturing a transmission drive unit (10) as recited in claim 1, wherein the spindle (16) with the drive wheel (18) is installed in the support tube (14) as a separate component (12), then the customer-specific receiving module (90) is attached to the support tube (14).

8. The method as recited in claim 7, wherein, when the receiving module (90) is installed, it may be adjusted with any angular position relative to the support tube (14) before the receiving module (90) is fixed in position relative to the support tube (14) in a non-positive or form-fit manner.

9. The method as recited in claim 7, wherein the drive assembly (42) is attached to the preinstalled, separate support tube assembly (12) using a coupling element (44).

10. The transmission drive unit as defined in claim 1, wherein the material of the receiving module (62) is hardened steel.

* * * * *